United States Patent [19]

Holberger et al.

[11] 4,403,282

[45] Sep. 6, 1983

[54] DATA PROCESSING SYSTEM USING A HIGH SPEED DATA CHANNEL FOR PROVIDING DIRECT MEMORY ACCESS FOR BLOCK DATA TRANSFERS

[75] Inventors: Kenneth D. Holberger, Marlboro; Joseph E. Samson, Framingham, both of Mass.

[73] Assignee: Data General Corporation, Westboro, Mass.

[21] Appl. No.: 144,884

[22] Filed: Apr. 29, 1980

Related U.S. Application Data

[63] Continuation of Ser. No. 871,690, Jan. 23, 1978, abandoned.

[51] Int. Cl.³ .......................................... G06F 13/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,766,526 | 10/1973 | Buchanan | 364/200 |
| 4,067,059 | 1/1978 | Derchak | 364/200 |
| 4,075,691 | 2/1978 | Davis et al. | 364/200 |
| 4,079,452 | 3/1978 | Larson et al. | 364/200 |
| 4,079,455 | 3/1978 | Ozga | 364/200 |
| 4,080,652 | 3/1978 | Cronshaw et al. | 364/200 |
| 4,090,238 | 5/1978 | Russo | 364/200 |
| 4,122,520 | 10/1978 | Adamchick et al. | 364/200 |
| 4,137,565 | 1/1979 | Mager et al. | 364/200 |
| 4,163,280 | 7/1979 | Mori et al. | 364/200 |

FOREIGN PATENT DOCUMENTS

| | | |
|---|---|---|
| 1172494 | 3/1968 | United Kingdom . |
| 1311183 | 4/1970 | United Kingdom . |
| 1373828 | 1/1972 | United Kingdom . |
| 1434041 | 7/1973 | United Kingdom . |
| 1447297 | 11/1973 | United Kingdom . |

*Primary Examiner*—Raulfe B. Zache
*Attorney, Agent, or Firm*—Robert F. O'Connell

[57] ABSTRACT

A data processing system having a central processor unit (CPU) and a memory and further including a high speed, or "burst multiplexer", channel for permitting direct access to the memory by an input/output (I/O) device without the need to use registers and control signals from the central processor unit. The high speed channel utilizes its own memory port separate from that of the CPU and includes internal paths for transferring addresses and data between an I/O device and the memory. The channel further includes a memory allocation unit (MAP) which can be loaded by transfer of memory allocation data via substantially the same common path as the I/O data transfer. Appropriate control logic is also included to control the data and address transfers and the MAP load and dump operations so that blocks of data words can be transferred sequentially and directly to or from the memory.

17 Claims, 14 Drawing Figures

DATA PROCESSING SYSTEM USING A HIGH SPEED DATA CHANNEL FOR PROVIDING DIRECT MEMORY ACCESS FOR BLOCK DATA TRANSFERS

This is a continuation of application Ser. No. 871,690, filed Jan. 23, 1978.

INTRODUCTION

This invention relates generally to data processing systems and, more particularly, to a data processing system for providing high speed data transfers from input/output (I/O) devices to and from the main memory of the system.

BACKGROUND OF THE INVENTION

In data processing systems which require the transfer of blocks of data between input/output (I/O) devices and the main memory of the system, such data normally is transferred via an appropriate bus, usually termed the I/O data bus, and requires the central processor unit (CPU) of the system to suspend its operation so as to make available appropriate registers internal to the processor for use in the data transfer operation. Moreover, the processor's own internal memory control signals are required to control the transfer to and from the memory via the central processor unit. For each data word which makes up the block of data words which are to be transferred, the processor controller is required to transfer an address from the I/O device, for example, to the processor, the address being then either directly used as a physical address to access the memory or appropriately supplied to a memory allocation and protection (MAP) unit of the processor which translates the logical address supplied by the input logic into the physical address for accessing the main memory into which or from which the data is to be transferred. The processor must also then handle the actual data word in its registers for appropriate transfer either into the memory or from the memory via the data processing system's memory bus. For each data word which is to be transferred, one address and one data word must be handled by the central processor unit. The handling of the address in the CPU registers and the MAP unit normally takes a reasonably long time period and the overall transfer cycle time can be as high as 1.5 to 2 microseconds in some systems. During such time period the central processor unit cannot perform any other operations which require the registers which are being so used and, therefore, the efficiency of its use is low. In such standard data channel transfer operations, the I/O devices may be sufficiently slow in their operation that the use of anything other than a standard low-speed data channel provides no real advantage. However, when dealing with high speed I/O devices it is desirable to avoid the unnecessarily long time period for address and data processing so that suspension of the CPU operation is minimized.

BRIEF SUMMARY OF THE INVENTION

In accordance with the invention, high speed I/O devices are permitted to transfer data directly into the data processing system's main memory through a second memory port which is different from that which is utilized by the central processor unit. High speed channel control logic permits such data transfer to take place without utilizing any of the internal registers of the central processor unit and without requiring the use of the CPU memory control signals. In effect, the data transfer bypasses the central processor unit and is able to provide for communication directly with the main memory. Such high speed channel is utilized primarily for high speed devices which can be suitably interfaced for such purpose. In effect, such a high speed channel multiplexes the transfers of bursts of data from a plurality of different I/O devices and, alternatively, can be referred to as a "burst multiplexor" channel, although the term high speed channel is generally used in the description which follows.

Since the high speed channel utilizes its own memory port, rather than the memory port used by the CPU, the required memory control signals for such use are generated within the high speed channel's own internal control logic and appropriate arbitration is utilized to assure that the memory is controlled only by one set of memory control signals which are derived from a combination of the memory control signals from the central processor unit and the memory control signals from the high speed channel. Appropriate memory port control logic is also utilized for such purpose.

The high speed channel also utilizes its own memory management, or memory allocation and protection (MAP), unit and complete blocks of data word transfers can be appropriately arranged so that only a single address is required, i.e. the address for the initial data word of the data block. Once the initial address has been appropriately allocated by the high speed data channel control logic, the high speed channel is arranged to provide subsequent addresses to the memory sequentially for each of the data words which are then sequentially transferred into or from the memory. The only other information required is that data word block length which is suitably monitored so that, when the last data word is transferred with respect to the last sequentially allocated address, the high speed channel is cognizant that the data transfer of the entire data word block has been completed.

The high speed channel generates substantially the same type of memory control signals as are generated in the central processor unit and further logic is provided for permitting the overlapping of memory access to a greater extent than is normally provided in the central processor unit. Thus, for example, the high speed data channel is arranged to overlap three memory access operations as opposed to the normal two memory access overlap available with some central processor units. Such overlapping, or "pipelining", of memory access is utilized with a suitable interleaving of the memory modules for a read access mode. During a write access mode the write operations are sufficiently fast that such triple pipelining is not required and such overlapping feature is primarily for use when providing data block transfers during the read mode only.

The high speed data channel in accordance with the invention is arranged so that it utilizes the same data path for loading address maps in the high speed channel MAP unit as it does to transfer its block of data words. Moreover, the high speed data channel is arranged so that its MAP tables, which are stored in the main memory, can be suitably loaded into the MAP unit by providing appropriate identification of the particular MAP tables which are to be utilized and the locations thereof in the main memory, the high speed channel merely accessing such MAP table information and loading its own MAP unit from the main memory using its own memory port, so that programmed I/O instructions from the central processor unit for MAP loading are not required.

The invention can be described in more detail with the help of the accompanying drawings wherein:

DESCRIPTION OF THE PREFERRED EMBODIMENT

Figure 1:
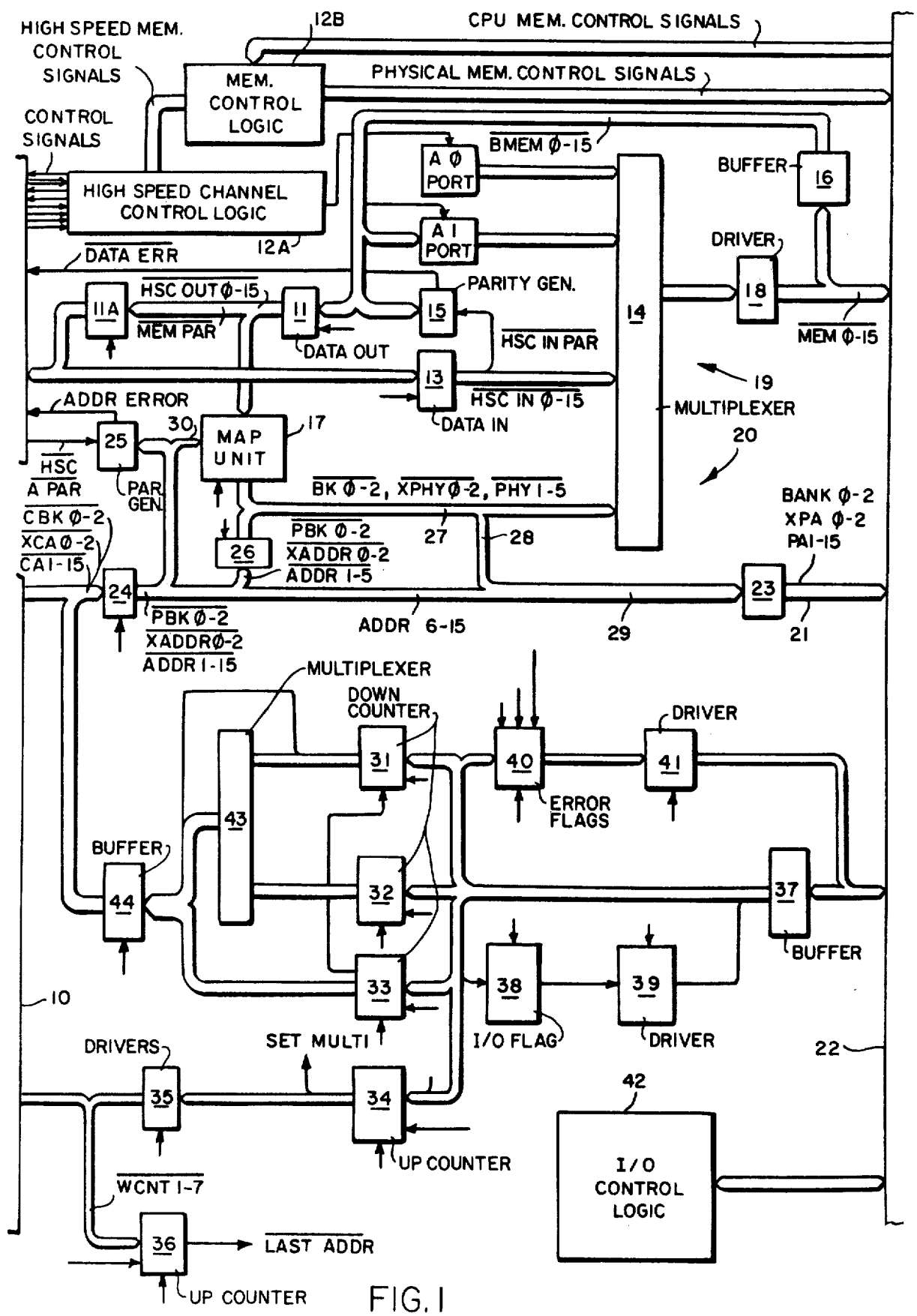
FIG. 1 shows a block diagram of the overall high speed channel of the invention.
Figure 2:
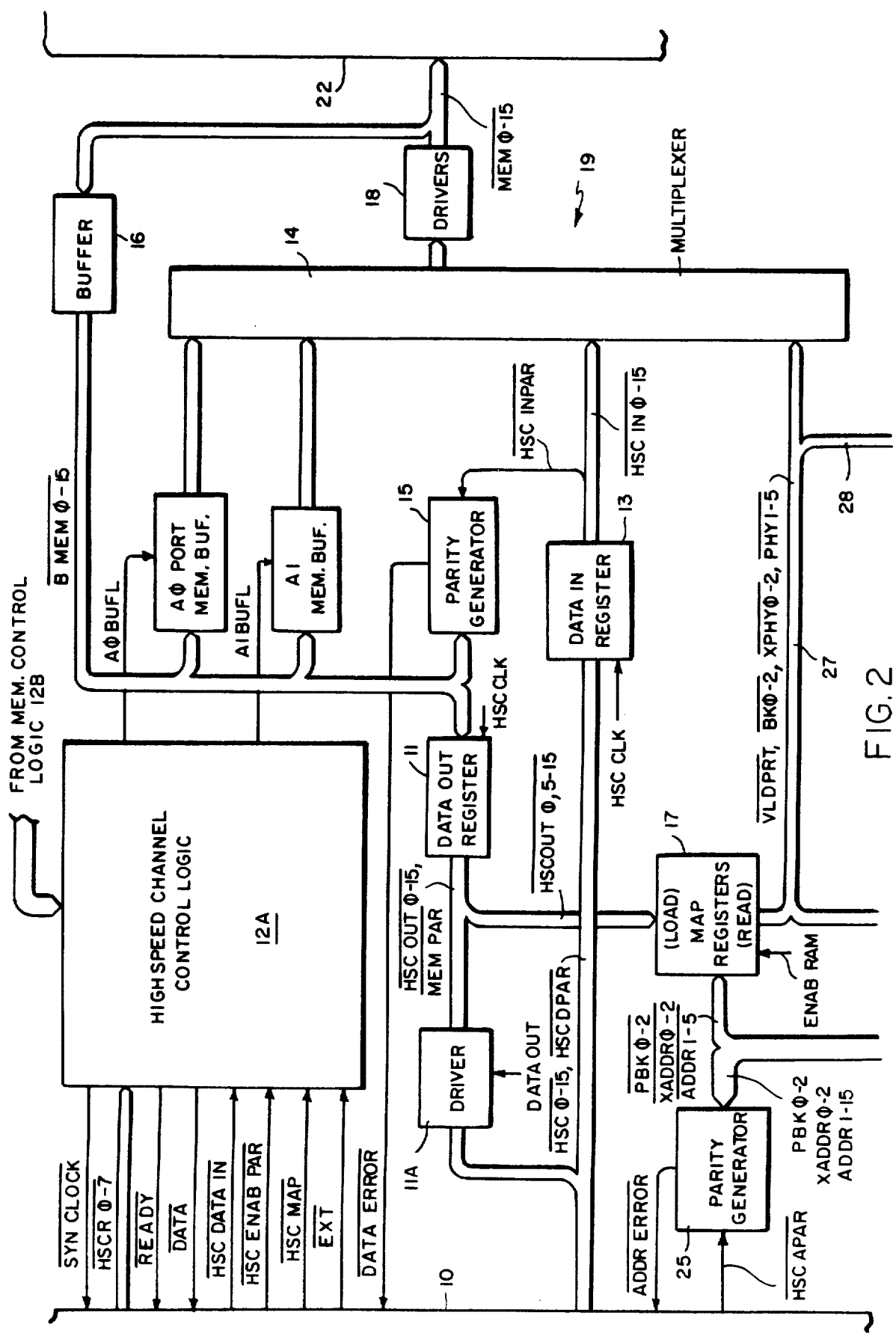
FIGS. 2 and 3 show more detailed block diagrams of portions of the high speed channel of FIG. 1.
Figure 3:
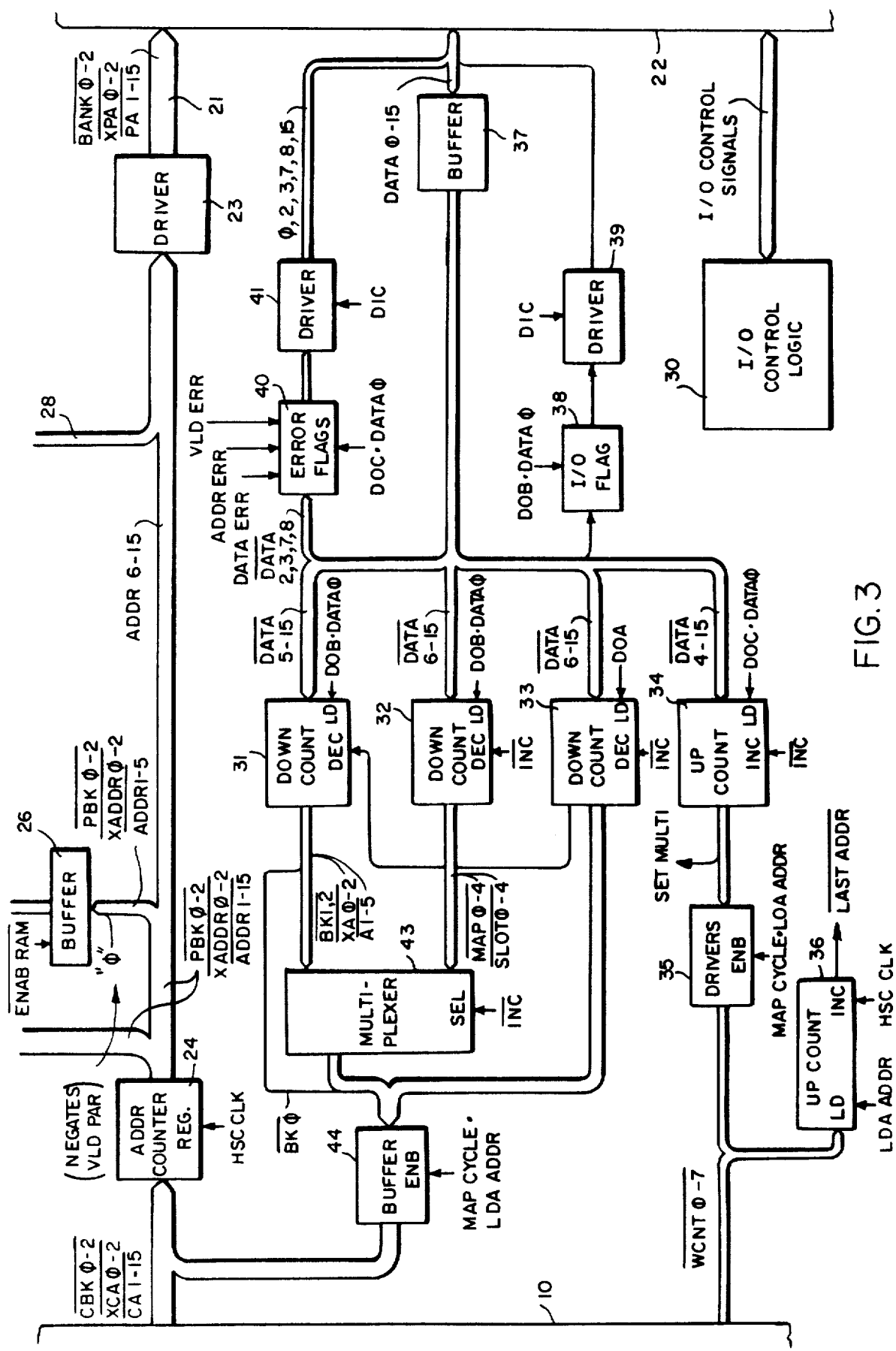

FIG. 1 shows an overall block diagram of the high speed data channel, while FIGS. 2 and 3 show appropriate portions thereof in more detail. As can be seen therein, the high speed channel utilizes two bus systems for communication externally to the channel, a first bus system identified as high speed channel bus system 10 and a second bus system identified as data processor bus system 22. In the particular embodiment described, the high speed data channel is arranged to connect to a plurality of I/O devices via the high speed channel bus system 10. The I/O devices may be arranged to have appropriately selected priorities to resolve conflicting transfer requests. In a preferred embodiment, for example, the priorities may be arranged by hard-wired logic in such a manner that the devices with the smaller channel latency requirements have the higher priorites in accordance with well known priority handling techniques. When the high speed channel control logic receives a transfer request, the channel accepts a channel control and address word and transfers the required data word block. The high speed channel includes a one-word data buffer register and delays subsequent data word transfers if the buffer is full and the high speed channel memory port is not currently available. In accordance with a specific embodiment of the invention, the maximum data output rate to the memory (i.e. in a read mode wherein data is read an I/O device and written into memory) is ten M-bytes per second (i.e. 200 nanosec./word). During a write mode (i.e. wherein data is read from memory and supplied to an I/O device) the average maximum data input rate is 6.67 bytes per second. The write mode rate can be increased to 10 M-bytes per second if overlapping techniques, as mentioned below, are used.

In FIGS. 1-3, the high speed channel includes channel control logic 12A and memory control logic 12B, described in more detail in subsequent figures, the channel control logic communicating with the high speed channel bus system 10 for receiving and transmitting appropriate request and control signals therefor and the memory control logic communicating with the channel control logic 12A and the memory control logic of the CPU to produce the physical memory control signals supplied to the data processor bus system 22.

Channel control logic 12A directs the activities of the high speed channel and is organized around a microprogrammed controller that times and sequences the processes that support data transfers to the external I/O devices or that MAP data transfers to the high speed channel. It directs the high speed channel to load a new address and word count, to decrement the word count, to increment the address, and to transfer the data word block. The control logic further controls the loading and dumping of the MAP unit contents and enables the MAP address translation for converting logical addresses to physical addresses. The memory control logic 12B is used to control the memory ports and to maintain the operation of the memory data drive unit and buffer register with respect to both ports (identified herein as A∅ and A1 ports) and optionally may be placed on the high speed channel board itself or elsewhere in the overall processing system.

The activities that occur during a data transfer through the high speed data channel are fully synchronous and an appropriate high speed channel clock sequences data transfers through the channel and times the activities which occur on the high speed channel bus system 10.

The data transfer logic shown generally by reference arrow 19 at the top of FIG. 1, and designated more specifically in FIG. 2, provides the appropriate data path routes for memory data to and from external I/O devices and address paths to the high speed channel MAP registers 17 and the main memory. The data transfer logic includes a data output register 11, a data input register 13 an input multiplexer 14 and a parity generator 15. The high speed channel buffers the memory output data (identified in FIGS. 1 and 2 as $\overline{BMEM\emptyset\text{-}15}$) at buffer 16, calculates the data parity bit, and stores the data and parity bit in a data out register 11 which supplies the data output and parity bit, identified as $\overline{HSC\ OUT}$ ∅-15 and MEM PAR. The data and parity bit from the data output register 11 are transferred to the active interface via bus drivers 11A on each $\overline{SYN\ CLOCK}$ cycle, thus the data and parity bit are supplied from data out register 11 to the high speed channel bus 10.

The high speed channel data input, together with a parity bit (identified as $\overline{HSC}$ ∅-15 and HSC DPAR) is supplied to data input register 13 which then supplies such data ( identified as HSCIN∅-15 and HSC IN PAR) on each SYN CLOCK cycle. Such data words are transferred to the memory via a multiplexer unit 14 and a driver unit 18 to the data processor bus 22. Such data is not only transferred to the memory but also back through the data loop formed by buffer 16 into the parity generator 15 during the transfer to the memory. The parity generator thereupon signals a data error (DATA ERR) if the calculated parity and stored parity bits do not match, in accordance with standard parity check techniques.

Data transfers between the memory and the MAP registers of the MAP unit 17 occur in substantially a similar manner. The data output register 11 receives MAP data from the memory via buffer 16 for transfer to the MAP registers effectively using the same data path as the data being read from memory for supply to the high speed bus 10, while MAP data in the MAP unit 17 can be read back into the memory from the memory bus driver unit 18 via internal bus 27 and multiplexer unit 14. No parity checks are required on the MAP data transfers.

The address logic, shown generally by reference arrow 20 in the central portion of FIG. 1 and in FIGS. 2 and 3, receives addresses from the device interfaces on the high speed channel bus 10 or from registers within the high speed channel itself, (such addresses being identified as having 21 bits comprising bits $\overline{\text{CBK } \emptyset\text{-2}}$, XCA $\emptyset$-2, and CA 1-15). The high speed channel then addresses physical memory locations via a physical address bus 21 which supplies the physical address to the data processor bus 22 and thence to the memory via address driver unit 23, such physical address bits being identified as comprising $\overline{\text{BANK } \emptyset\text{-2}}$, XPA $\emptyset$-2 and $\overline{\text{PA}}$ 1-15. The initial address word of a data block which is to be transferred is stored in an address counter register 24, the output of which is defined as including bits $\overline{\text{PBK}}$ $\emptyset$-2, XADDR $\emptyset$-2, and ADDR 1-15. An address parity generator 25 checks parity on the address word received from the interface (identified as the parity bit $\overline{\text{HSC APAR}}$) and supplies an appropriate parity error indication ($\overline{\text{ADDR ERROR}}$) if the calculated address parity and the stored address parity bits do not match.

The higher order bits of the address from address counter register 24 ($\overline{\text{PBK}}$ $\emptyset$-2, XADDR $\emptyset$-2, and $\overline{\text{ADDR 1-5}}$) specify the desired page address. If the mapping function (i.e. the operation of the MAP registers of the MAP unit 17) is not to be utilized, the MAP unit is disabled (an $\overline{\text{ENAB RAM}}$ is supplied to buffer register 26) which operation prevents enabling of the MAP unit 17 and passes the desired page address directly to the memory via buffer 26 and internal buses 27, 28 and 29, (the physical page address bits being identified as BK $\emptyset$-2, XPHY $\emptyset$-2 and $\overline{\text{PHY 1-5}}$). If the mapping function is to be utilized, the MAP unit 17 is enabled (an ENB RAM signal is supplied to MAP unit 17), the logical page address being supplied to the MAP unit via internal bus 20 thereupon causing the previously loaded MAP registers to translate the logical page address into the physical page address for supply to the bus 21 to bus 22 via internal buses 27, 28 and 29 and driver unit 23. In each case, whether the page address is supplied directly from the address counter register 24 or is supplied from the MAP registers the lower order address bits (identified as ADDR 6-15) are directly supplied to the physical address bus 21 in order to define address words within the selected pages identified by the page address.

If the MAP registers are to be used for translating logical page addresses to physical page addresses, the software which is being used must supply instructions for identifying an initial MAP register address and a starting memory address prior to a MAP load (i.e. a MAP data transfer). Appropriate I/O control logic 42 decodes the instructions in accordance with the software and directs the decoded information to a set of counters 31, 32, 33 and 34. Two of the counters (namely, counters 31 and 33) specify the memory address for accessing the data for the MAP data transfer via multiplexer 43 and buffer register 44. A third counter 32 supplies the address at which such MAP data is to be transferred within the MAP register. The fourth counter 34 is utilized in connection with the word count logic, as discussed in more detail below.

The word count logic, shown generally at the bottom of FIG. 1 and in FIG. 3, receives a word count (i.e., a representation of the total number of words which are to be transferred in the data work block) from the device interfaces at the high speed channel bus 10, or from counter register 34 within the high speed channel itself, which word count bits are identified as $\overline{\text{WCNT 1-7}}$. The word count logic counts off the number of words for the data transfer, i.e., an up-counter 36 increments as each word is transferred and eventually indicates completion of the operation when the final word has been transferred by the supplying of a $\overline{\text{LAST ADDR}}$ signal.

Appropriate software must also supply a word count for a MAP data transfer instruction. The I/O control logic 42 decodes the MAP data transfer instruction word count and directs such information to up-counter 34 via the data processor bus 22 and buffer register 37. Counter 34 increments in step with the word counter 36 and indicates multiple MAP register transfers by an appropriate SET MULTI signal.

Additional logic within the I/O control logic unit 42 also provides a flag signal to indicate the direction of the MAP transfer, i.e., a MAP load or a MAP damping operation, via an I/O flag register 38 and drivers 39, and also provides an indication as to whether an error has occured, during a data transfer, via an error flag register 40 and drivers 41.

The high speed channel shown in FIGS. 1-3 utilizes two address modes. A first address mode is a physical (or direct) address mode which uses the address which is specified by the high speed channel interface for locating the address of the first word of (i.e., the start of) a memory data block which is to be transferred. As the data transfer proceeds, the interface increments the physical address to access sequential memory locations.

A second address mode is a logical (i.e., a mapped) address mode which utilizes a table lookup procedure in the MAP registers for translating the logical page address which is specified by the active high speed channel interface into a physical page address. The high speed channel control defines the higher order bits of a memory address (PBK $\emptyset$-2, and ADDR 1-5) as the page address and the lower order bits (ADDR 6-15) as the word address on the selected page, as discussed above. In a preferred embodiment, for example, each page address may locate a group of contiguous memory locations (e.g., for a particular embodiment described there can be 1024 such contiguous memory locations). The associated word address locates an individual memory location within a particular selected page. During the mapped, or logical address mode, the logical page address locates a register entry in the MAP registers, the contents of the register then translate the logical page address to produce the physical page address which is thereupon recombined with the logical word address (APDR 6-15) to form a physical address which is supplied to the memory via drivers 23 at the physical address bus 21. As the data transfer proceeds the interface increments the logical address to access sequential memory locations.

Figure 4:
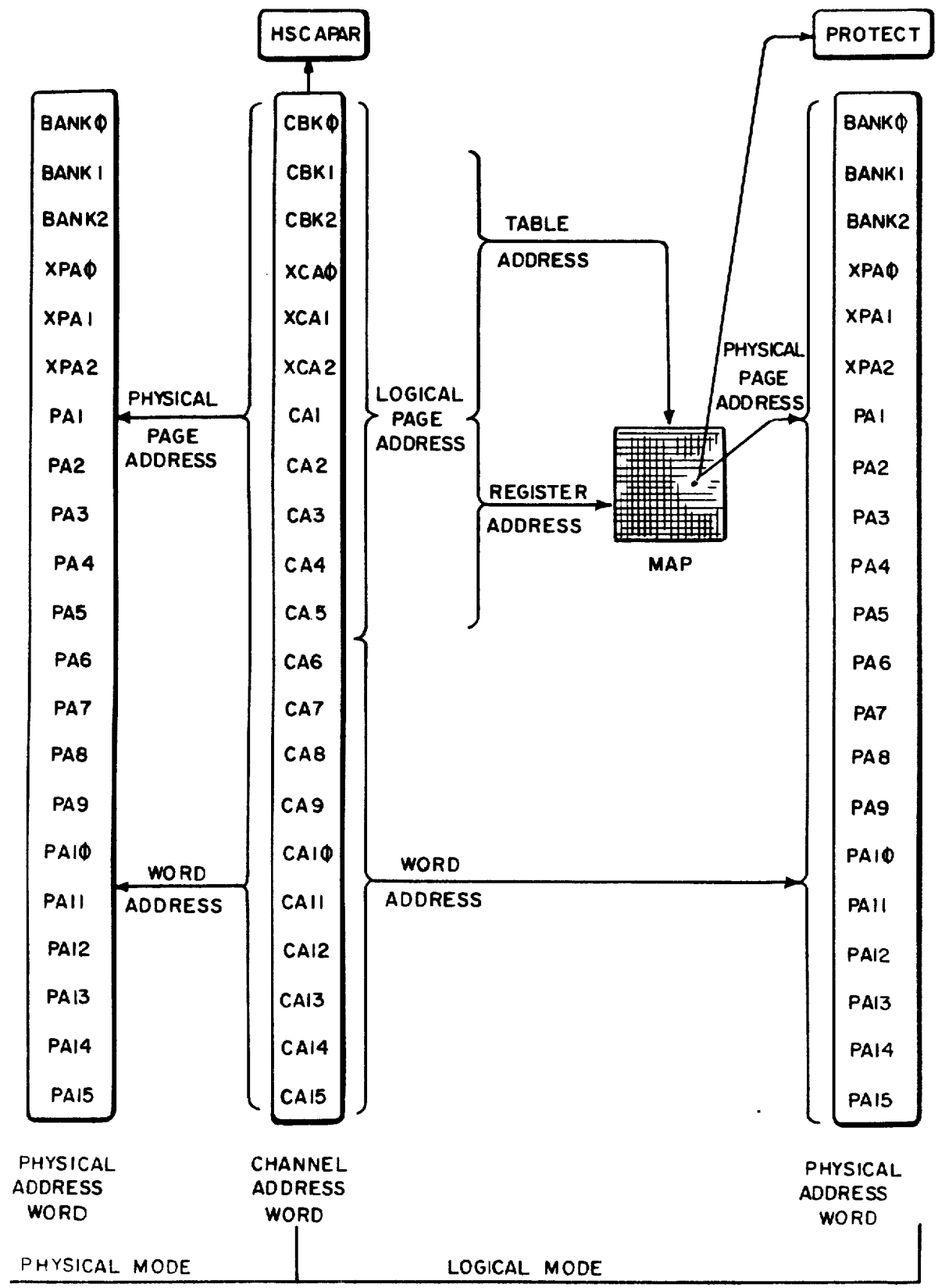
FIG. 4 shows a diagrammatic representation of the logical and physical address modes used in the high speed channel of FIGS. 1-3.

If, during the sequential address tracking process, the device interface increments the logical page address, the MAP registers define a new physical page address to access a different block of memory locations. FIG. 4 shows the address formats for the channel address word and the physical address words as used in the physical and logical address modes. In accordance therewith, the channel address word can be supplied directly as the physical address word shown at the left of FIG. 4 or it can be supplied as the logical address word and be appropriately translated by the MAP registers to obtain the physical address word as shown at the right of FIG. 4.

In the preferred embodiment shown in FIGS. 1-3, the high speed channel bus 10 connects fourteen signals to the channel device interfaces. Such signals include the timing or clock synchronization signal (SYN CLOCK), the transfer request signals (HSCR 0-7), the transfer control signals (READY, DATA, ADDR ERROR, DATA ERROR), the channel control signals (HSC DATAIN, WCNT 0-7, HSC ENB PAR, HSC MAP, EXT), the address signals (CBK0-2, XCA0-2, CA1-15, HSC APAR) and the data signal (HSC 0-15, HSC DPAR).

The timing signal is identified as the SYN CLOCK signal and synchronizes all activities on high speed channel bus 10. The falling edge is used to strobe all information flow between the high speed channel and the channel interfaces. The period of the SYN CLOCK varies, the minimum period in a preferred embodiment being 200 nanosec., which corresponds to a 5 MHz maximum data transfer rate. The period can be extended if the high speed channel is delayed while waiting for a memory cycle.

Each channel device interface has its own request line to initiate data transfers identified as the high speed channel request signals HSCR 0-7. Each request signal is assigned a priority with HSCR7 being the highest priority and HSCR0 the lowest priority. The request lines in the preferred embodiment are run in parallel to all device interfaces so that each interface can determine if another interface is making a request. Conflicting interface memory access requests are appropriately resolved by the high speed channel interfaces and, in a preferred embodiment, one such resolution has been devised to assign each interface a unique request signal (such assignment being made at the time of system configuration). The high speed channel monitors all the request lines but only one interface will determine itself whether it is making the highest priority request and the interface making such highest priority request will then present an address and channel control word and thereupon transfer the data block.

The transfer control signals include the READY, DATA, ADDR ERROR and DATA ERROR signals. The high speed channel only accepts transfer requests when it is ready to process them and a transfer request that occurred before the high speed channel is ready is delayed until the high speed channel asserts the READY signal. Once the READY signal is asserted, the interface making the highest priority request places an address and a channel control word on the bus at the first SYN CLOCK signal edge following the READY indication. When the direction of the transfer is into memory, the READY signal is re-asserted at the beginning of the transfer of the last word in the block. When the direction of the transfer is out of memory, the READY signal is re-asserted at the beginning of the transfer of the next-to-last word in the block. This procedure allows overlap between the transfer of channel control information with the transfer of data.

The high speed channel asserts the DATA signal during the actual data transfer. Data word transfers occur on clock edges when the DATA signal is asserted. The high speed channel may delay the clock signal for short periods during the data exchange, if the memory is not ready in order to prevent overrun/underrun conditions within the high speed channel itself.

The high speed channel also checks for odd parity on the address and data-in words when parity is enabled. The high speed channel then flags address parity errors (ADDR ERROR) and data parity errors (DATA ERROR) to the interfaces to permit the active interface to take corrective action. If the high speed channel asserts an ADDR ERROR signal, the data transfer is aborted and the high speed channel asserts the READY signal during the following cycle.

Other channel control signals received from the devices include the HSC DATA IN, the WCNT 0-7, the HSC ENB PAR, the HSC MAP, and the EXT signals.

The high speed channel data-in signal (HSC DATA IN) indicates the direction of the subsequent data transfer (i.e., a "transfer in" for writing of data into the memory or a "transfer out" for a reading out of data from the memory) and the word count signal (WCNT 0-7) indicates the number of data words of the data block which are to be transferred. The interface may enable parity checks on the address data word by supplying a high speed channel parity enable signal (HSC ENB PAR) and may enable the high speed channel to permit MAP address translation (HSC MAP). AN extend signal (EXT) is available in reserve for other uses (not otherwise used herein) in the preferred embodiment shown.

The address signal (CBK 0-2, XCA 0-2, CA 1-15, and HSC APAR) specifies a 21-bit starting address for a data transfer and, if parity is enabled, the device interface conditions the address parity bit (HSC APAR) to maintain odd parity, for example, on the address bus (i.e., by odd parity, it is meant that the sum total of "ones" in the address word, including the parity bit, is odd). The address counter register 24 in the high speed channel latches the starting address and then increments as the data transfer proceeds. The counter may generate direct physical addresses or the MAP may perform a logical to physical address translation, as discussed above. The data signals (HSC 0-15 and HSC DPAR) transfer 16-bit data words and, if parity is enabled, the parity bit (HSC DPAR) is set to maintain odd parity on the data bus.

The high speed channel control is implemented with appropriate micro-coded firmware as disclosed in more detail below. The micro-code is stored in a read-only-memory (ROM). A preferred embodiment uses 32 control words containing 19 bits each in a micro-program address space. There are eight micro-program spaces, each space defining an operational mode. The location of each micro-program address space in the ROMS, and the functions executed, are shown in the table below.

| Address | Mode |
| --- | --- |
| 000 | Standard Data Transfer |
| 037 | Map Load Dump |

-continued

| Address | Mode |
| --- | --- |
| 040 077 | Two Step Diagnostic Mode |
| 100 137 | Exogeneous Data Transfer |
| 140 177 | Map Load Dump |
| 200 237 | Two Step Diagnostic Mode |
| 240 277 | Extended data transfer |
| 300 337 | Extended data transfer |
| 340 377 | Extended data transfer |

The first micro-program space defines the standard operations discussed above, that is, such mode supports data transfers to the map (MAP LOAD/DUMP) and standard data transfers at the high speed channel interfaces (STANDARD DATA TRANSFER) at the normal data rate (6.67 M-bytes/sec. out and 10 M-bytes/sec. in).

The second and fourth micro-program spaces define diagnostic modes which do not form part of this invention and need not be described in any further detail here. Such modes can be made available for example, to allow a diagnostic programmer to check the high speed channel data paths that are not exercised during a normal MAP LOAD/DUMP sequence. The third micro-program space is reserved for the triple overlap read memory operational mode (up to 10 M-bytes/sec.). The write memory and MAP operations are the same as in the standard mode. The final four spaces in the preferred embodiment discussed herein are reserved for future uses which do not form part of this invention and need not be described in more detail.

Figure 5:
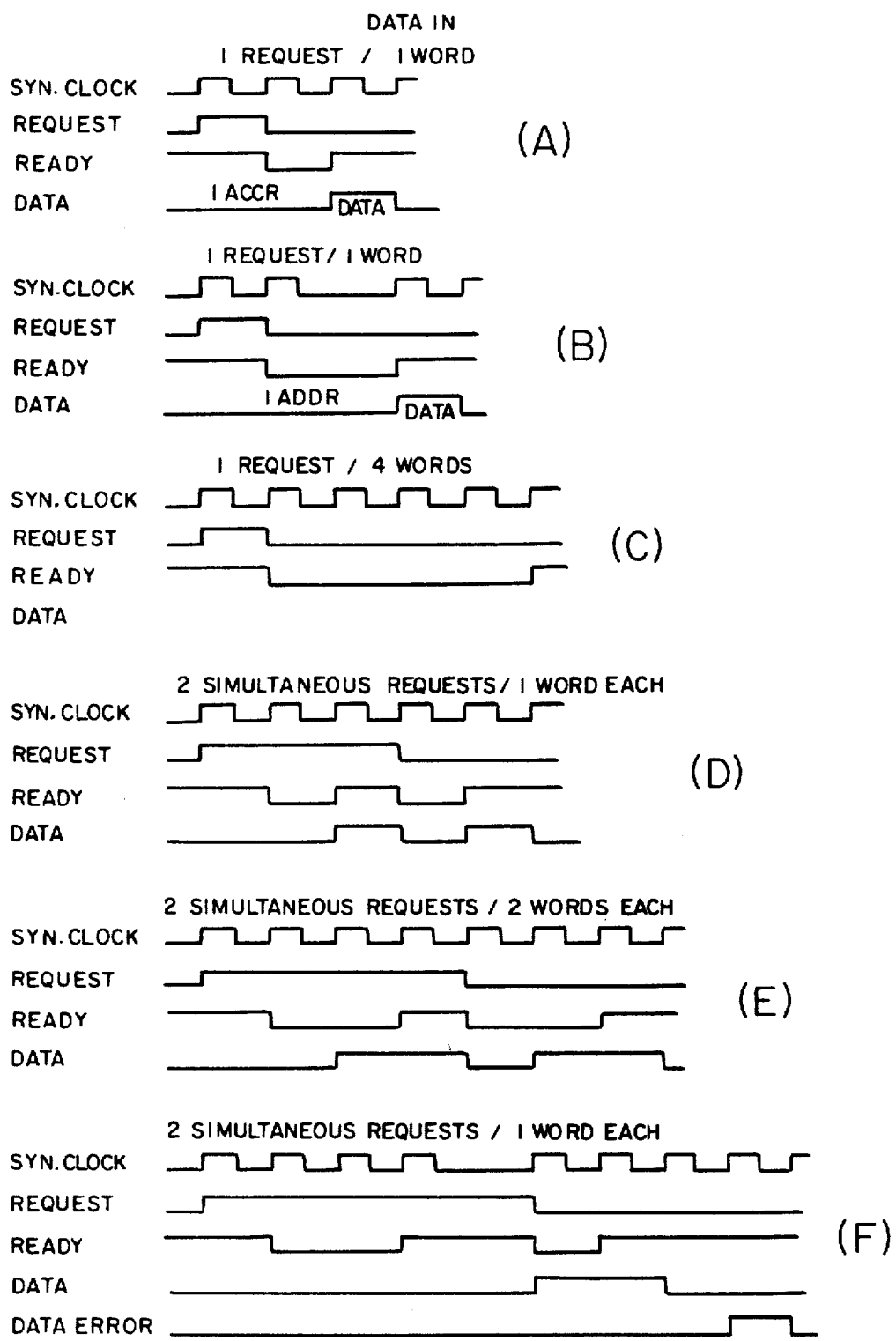
FIGS. 5 and 6 show timing diagrams depicting various situations where data is being transferred into or out of the memory.
Figure 6:
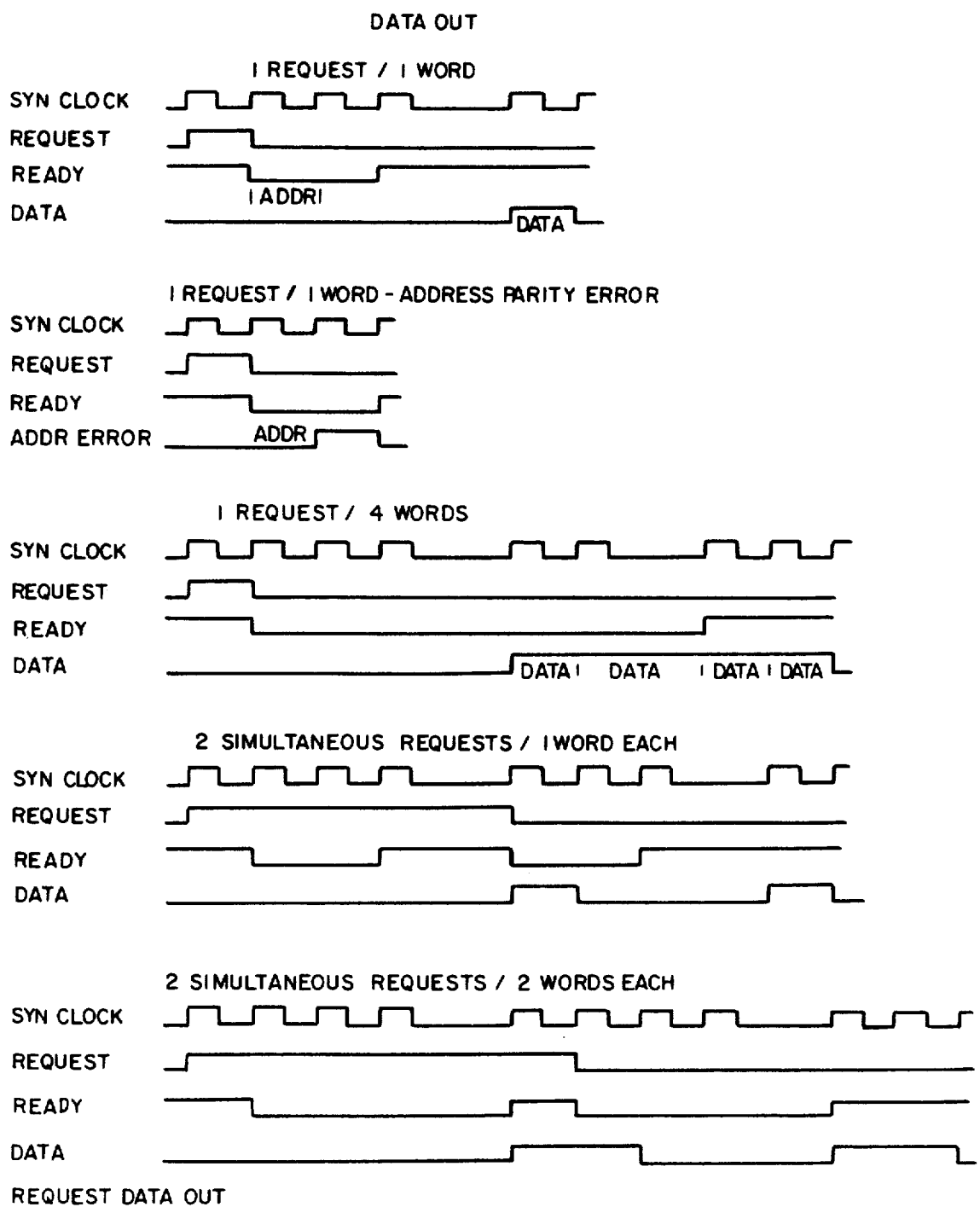
Figure 7:
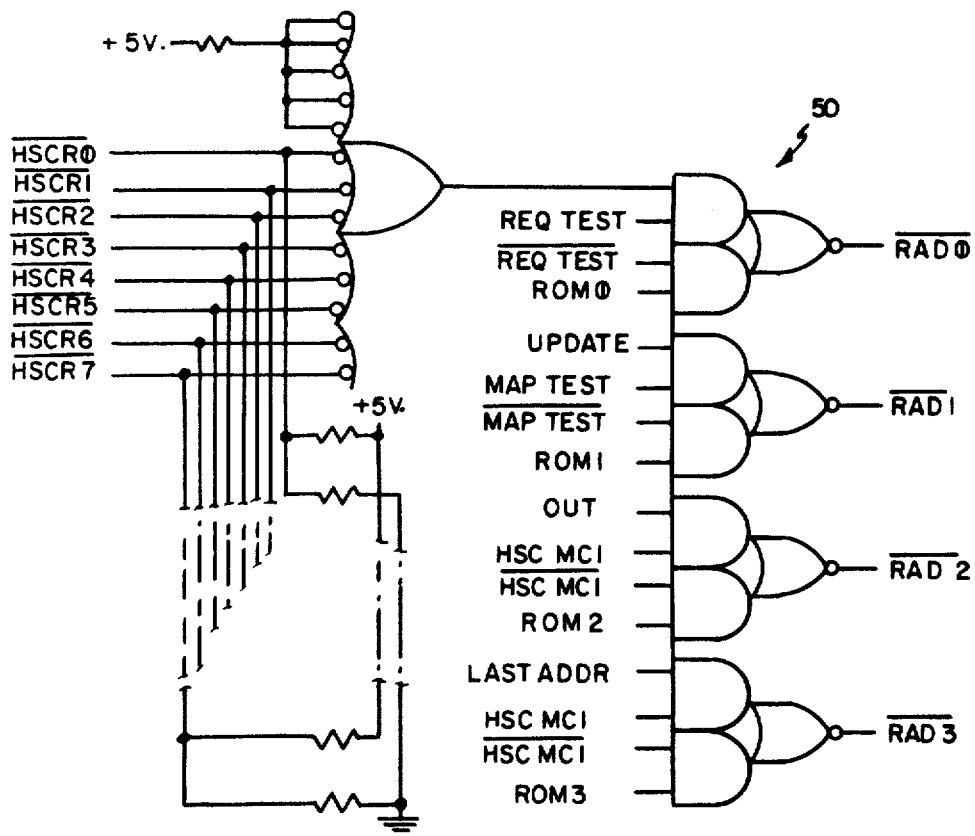
FIG. 7 shows logic circuitry for determining if a data transfer and/or a MAP transfer is requested.
Figure 7:
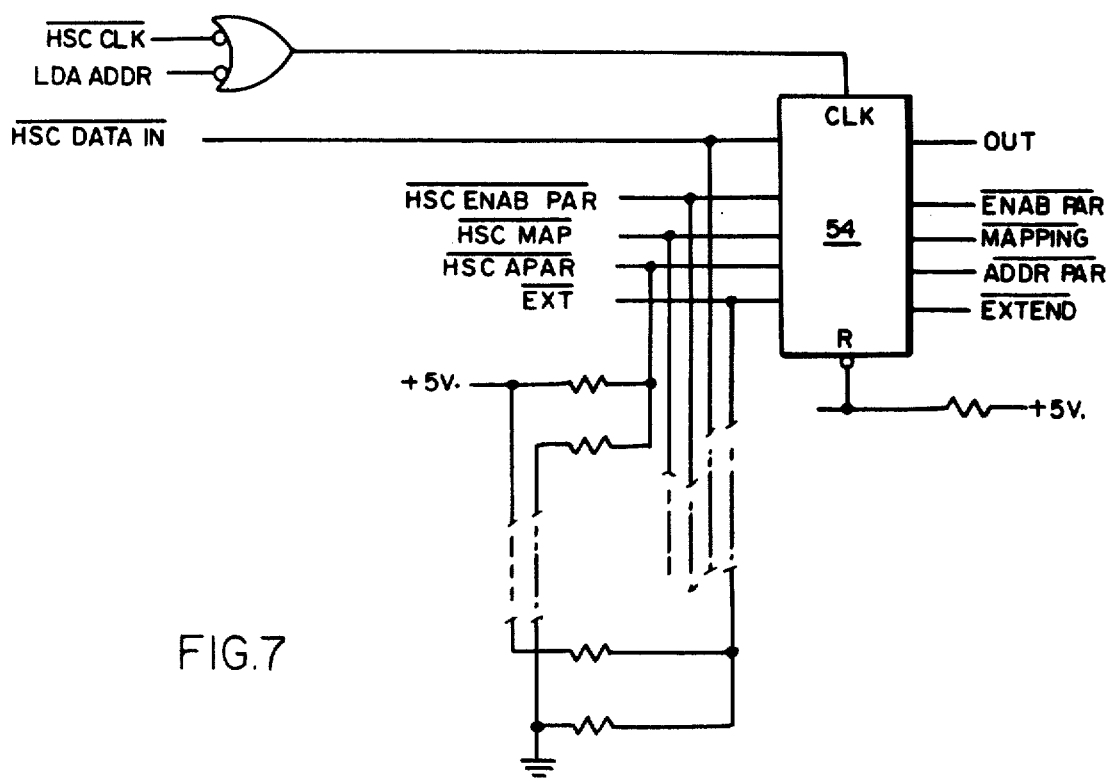
Figure 8:
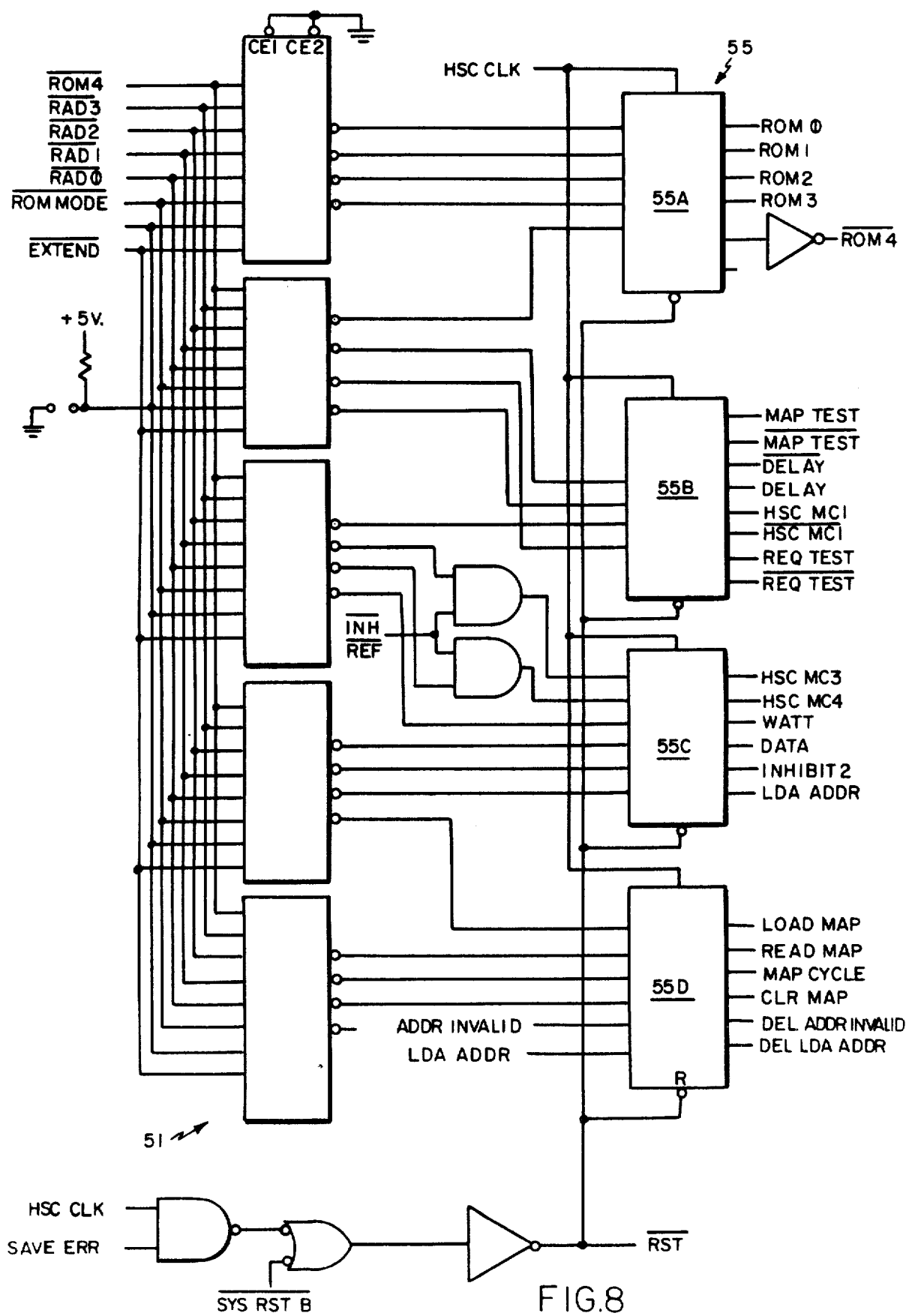
FIG. 8 shows logic circuitry for generating various control signals for use in operating the high speed data channel of the invention.

Exemplary wave forms for the $\overline{\text{SYN CLOCK}}$, $\overline{\text{REQUEST}}$, $\overline{\text{READY}}$, and $\overline{\text{DATA}}$ signals at the high speed channel/controller interface are shown in FIGS. 5 and 6 for various data-in and data-out situations.

Thus, in FIG. 5 where a single request is received to transfer a single word into memory, the situation (identified as waveforms A in FIG. 5) shows the appropriate relationships among such signals. Other situations involving single word read memory transfers (waveforms B), multiple word transfers (waveforms C), and multiple requests (waveforms D, E and F) are also shown. Similar situations are shown with respect to the data-out situation of FIG. 6.

While FIGS. 1-3 disclose an overall block diagram of a high speed data channel (FIG. 1) and more detailed descriptions of the blocks therein (FIGS. 2 and 3), more detailed logic diagrams thereof are described with the help of FIGS. 7-14.

FIGS. 7-12 depict logic diagrams for the high speed channel control and clock logic 12A. A high speed channel request signal $\overline{\text{(HSCR}\emptyset\text{-7)}}$ from one of eight device interfaces (see FIG. 2) is supplied to logic 50 (FIG. 7), together with a REQ TEST signal for determining if a data transfer is being requested and a MAP TEST signal for determining if a map transfer is being requested. Logic 50 provides for a combination of ROM address signals $\overline{\text{(RAD}\emptyset\text{-3)}}$ which are supplied to programmable ROMS 51 (FIG. 8) for starting a data transfer if a high speed channel memory control signal (HSCMCl) is present and the "last address" signal from a previous transfer (signifying the end of the transfer) has been asserted (LAST ADDR). At the same time the READY signal is supplied from logic 52 (FIG. 11) to the device interface (see FIG. 2).

Receipt of the READY signal by the device interface thereupon permits the requesting device to supply its address information, whether for a read from or write into memory operation. In the case of a write operation the device supplies an $\overline{\text{HSC DATA IN}}$ signal (see FIG. 2). The $\overline{\text{HSCMAP}}$ signal indicates whether logical or physical address modes are to be used. If data are to be transferred to or from memory, the appropriate memory address and the number of data words which are to be transferred are supplied by the device interface. If parity is to be checked for both address and data, the data device also supplies an $\overline{\text{HSC ENAB PAR}}$ signal.

Logic 55A-55D responds to the outputs of the programmable ROMS 51 and supplies the various control signals shown for use internally within the high speed channel for operation of the various units discussed with reference to FIGS. 1-3. Thus, when the channel is ready for an actual data transfer, the data signal is asserted at logic 55C and at each clock signal a word of data is suitably transferred until the entire block of data words is transferred, in which case the last address signal at the output of up-counter 36 (FIG. 3) prevents the further assertion of the DATA signal so that the high speed data channel is placed in condition for subsequent data transfers in response to a new request signal.

Figure 9:
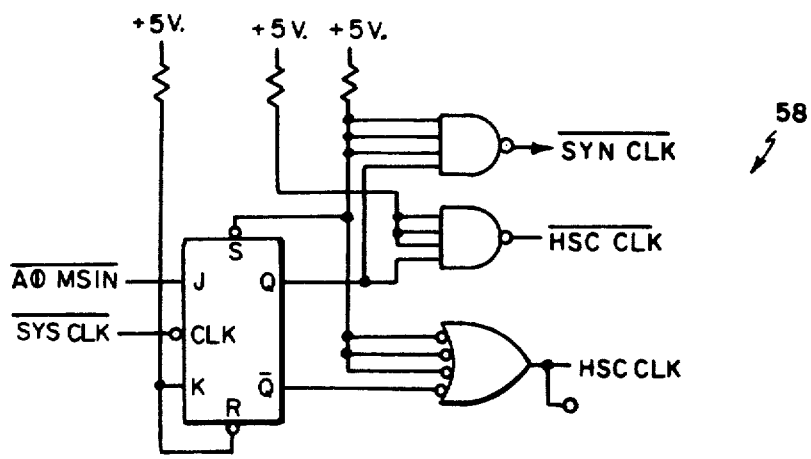
FIG. 9 shows logic circuitry for generating certain clock signals used in the high speed data channel of the invention.
Figure 10:
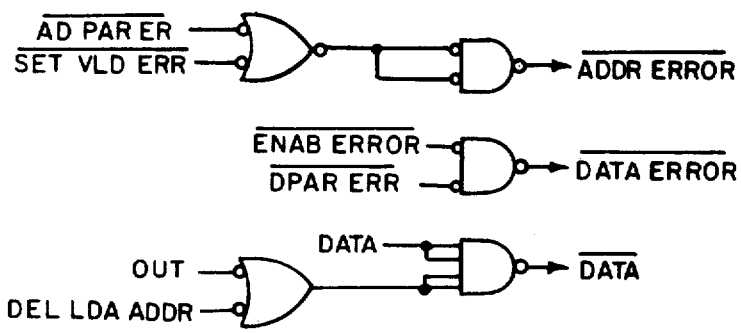
FIG. 10 shows logic circuitry for generating signals which identify the presence of a data or an address error.
Figure 11:
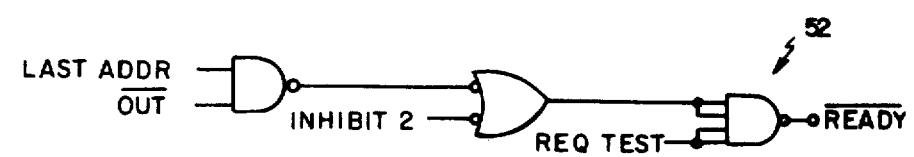
FIG. 11 shows logic circuitry for generating the $\overline{READY}$ signal to request a device to supply address information for a read or write memory operation.
Figure 12:
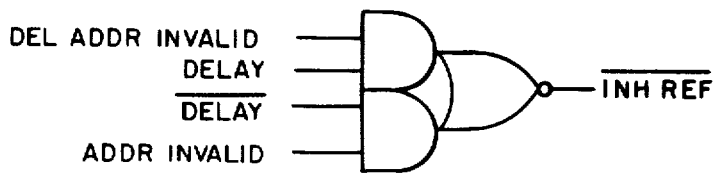
FIG. 12 shows logic circuitry for generating an $\overline{INH\ REF}$ signal as required in the logic circuitry of FIG. 8.

The system clock signal as shown by logic 58 of FIG. 9 is utilized to provide the SYNCLK signal, as well as the HSCCLK signal. The remaining logic of the high speed channel, which includes the various drivers, buffers, data registers, parity generators, multiplexers, and the map unit registers, represent logic configurations well known to those in the art and need not be described in more detail here. Once the overall data and address path configurations shown in FIGS. 1-3 are known and the control logic for unit 12A is known as shown by FIGS. 7 to 12, the construction and operation of the overall system is well within the skill of those in the art.

Figure 13:
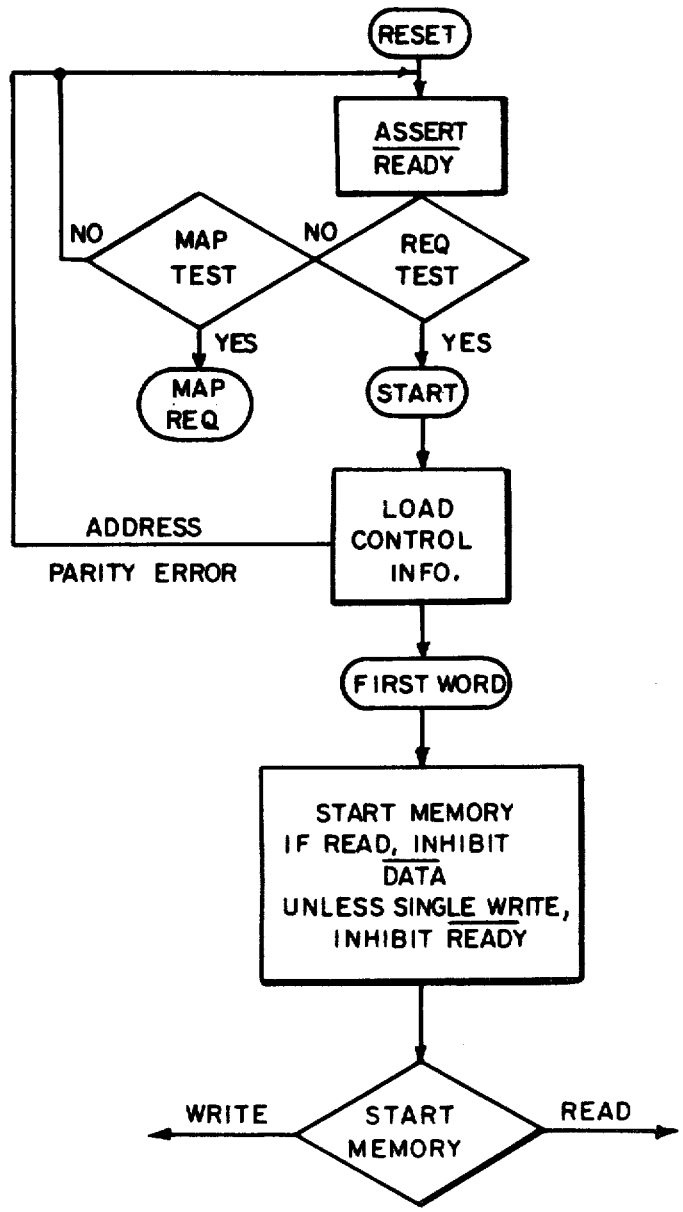
FIG. 13 shows a flow chart depicting the steps used in a data transfer in accordance with the high speed data channel of the invention.
Figure 13:
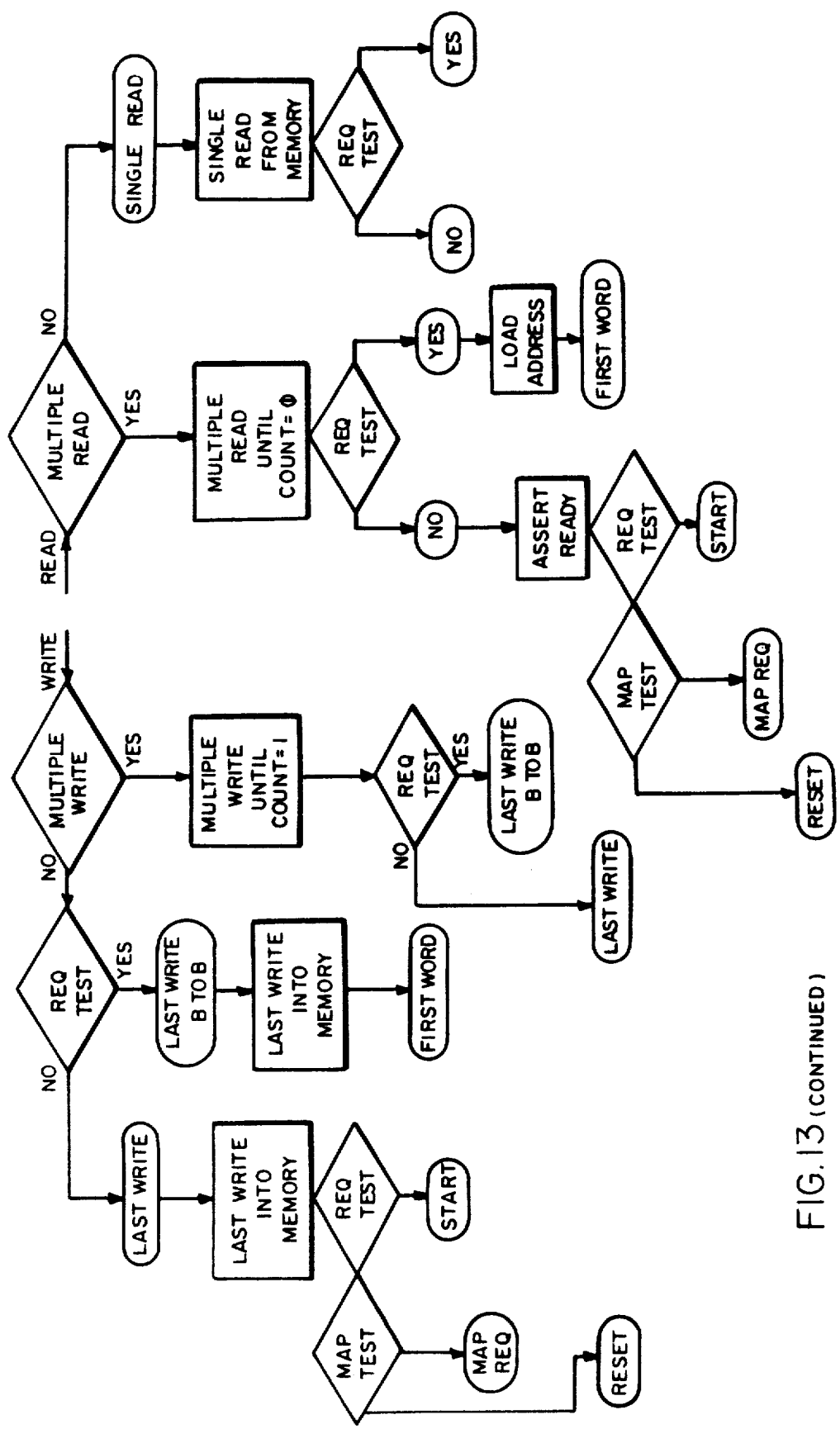
Figure 14:
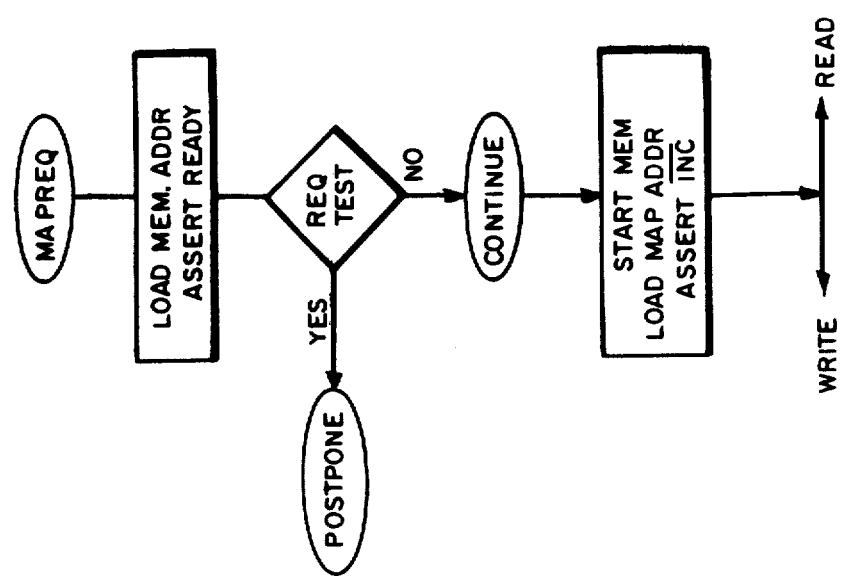
FIG. 14 shows a flow chart depicting the steps used in a MAP transfer in accordance with the high speed data channel of the invention.
Figure 14:
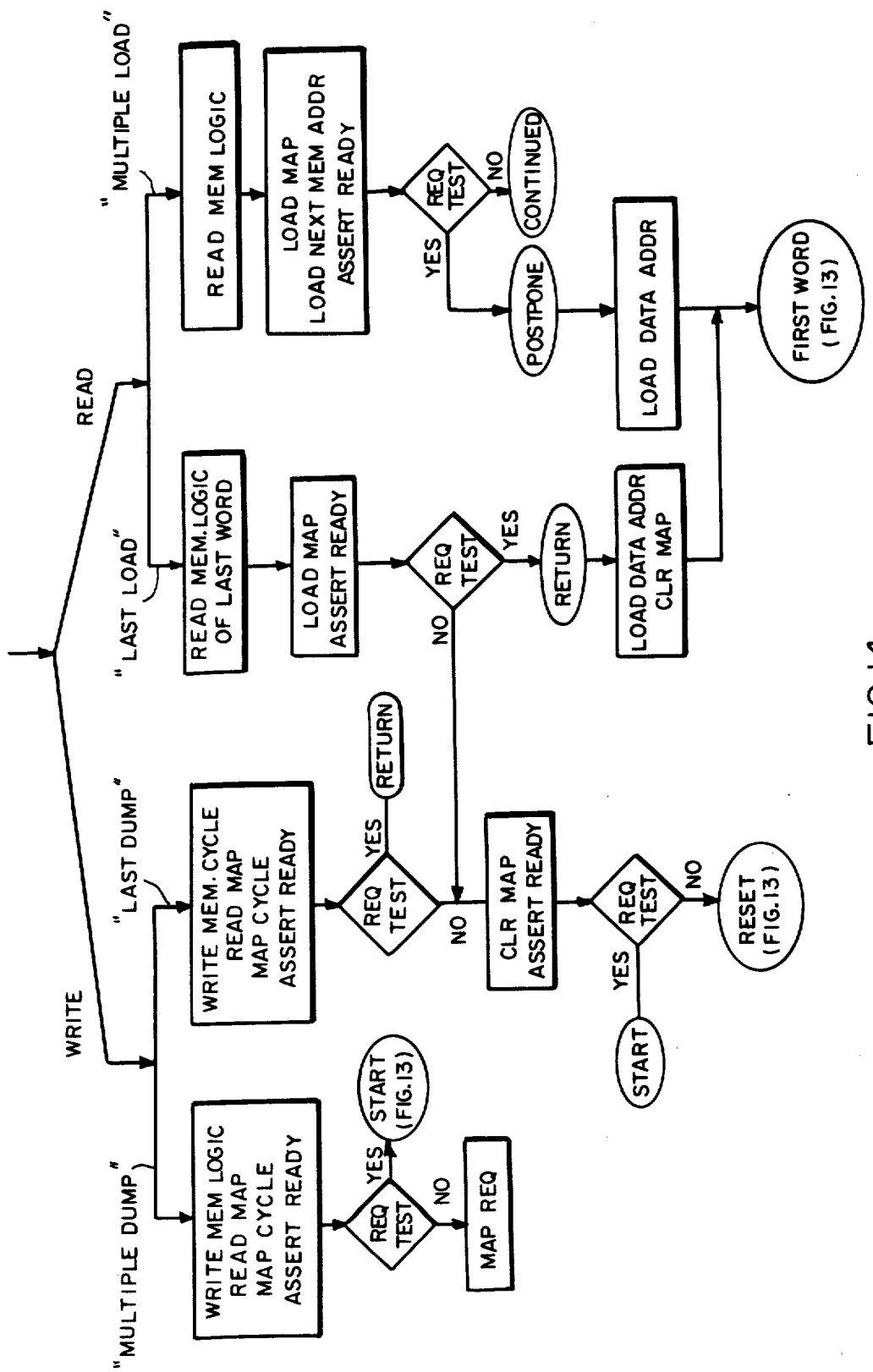

It is helpful in further understanding the operation of the high speed channel system to consider also the flow charts depicted in FIGS. 13 and 14, FIG. 13 showing the steps utilized in a data transfer and FIG. 14 showing those utilized in a MAP transfer.

As can be seen in FIG. 13, when the high speed channel is set to accept a request (i.e., it is in a RESET condition), it asserts its $\overline{\text{READY}}$ signal and tests to see if a data transfer request is being made by a device interface. If no data request is currently being made, the high speed channel then makes a test to determine if a MAP transfer has been requested. If it has, the high speed channel performs the steps discussed below in connection with FIG. 14. If no MAP transfer request is currently being made, the high speed channel stays in the reset state and again goes through the same process.

If the data transfer request test (REQ TEST) shows that a device is requesting a data transfer, the high speed channel starts the transfer operation and loads the control information from the device which is required for such data transfer. In this state, the HSC stops asserting the ready signal. In accordance with the HSC bus protocol, this action signals the HSC interface to send a command word on the next SYNCLK edge. The command word consists of the initial logical or physical memory address, the word count, the direction of the transfer, and indications of whether mapping or parity checking is to be used.

The high speed channel then starts the memory. If a "read" transfer operation is indicated, the assertion of the $\overline{\text{DATA}}$ signal is inhibited temporarily until the initial memory location where the "read" is to take place is accessed. Moreover, the $\overline{\text{READY}}$ signal must be inhibited so that no other device can access the high speed channel during the data transfer operation, unless the data transfer only involves the writing of a single word. Such a single write operation occurs sufficiently fast that the $\overline{\text{READY}}$ signal need not be inhibited since such single write operation will be completed by the time a subsequent requestor is ready to perform its data transfer.

If an address parity error is discovered, the system must be reset so as to permit the requesting device to make the necessary error correction before it can again request a data transfer.

Memories are started, and either read or written in an overlapped manner until all the words in the block are transferred. Different "paths" are taken in the microcode for one word read, one word write, multiple word read, and multiple word write transfers. If, in the transfer of a block of data, another request (from a different device interface) occurs, the micro-code operates in such a manner as to overlap the transfer of the command word for that second request with the end of the transfer of the data for the first request.

As shown in FIG. 13, if the transfer is to be a multiple write transfer, the high speed channel provides for the multiple writing of successive data words within a data block into the memory until the word count equals 1, i.e., the next to the last word has been transferred. The high speed channel then makes a request test to determine if another device is currently making a transfer request. If one is, the combined operation may be called a back-to-back (B to B) operation. If not, the system thereupon writes the last word (i.e., as if it were in a single write operation) and then again performs the necessary request test and MAP test operations to determine whether a subsequent request of either nature is occurring. If not, it proceeds to its reset condition and begins the process again.

If a back to back "write" operation is requested, the high speed channel writes the last word of the first request and receives again the necessary control information for the subsequent data block write transfer simultaneously. It then immediately starts the first memory address for the next write transfer and receives the first data word from the interface.

If the data transfer is to be a multiple read transfer, the high speed channel reads successive words of the data block accessed from the memory until the word count equals zero, i.e., all of the words are accessed from memory. The high speed channel then makes a further request test to determine if another device wishes to make a back-to-back transfer in which case it loads the necessary control information for such subsequent transfer, then proceeds to execute that transfer. If there is no back-to-back request the high speed channel again asserts its ready signal and goes through the request and MAP testing as before.

If the read request is for a single word to be read from memory, the high speed channel reads the single word and again asserts its ready signal and, as before, performs a request test to determine whether a back-to-back transfer is required or not.

If a MAP transfer test shows that the central processor has requested a MAP transfer, the high speed channel starts the MAP transfer operation as depicted in FIG. 14. Initially, the address in the memory at which the desired MAP data is located is loaded into the address counter register 24 via registers 31 and 33, multiplexer 43, and buffer 44 (see FIG. 3). The MAP transfer word count is also loaded into the word count register 36 from register 34 via drivers 35. The READY signal is asserted and a data transfer request test is again made to determine if a data transfer is being requested.

If a data transfer is then being requested the MAP transfer operation is postponed and the data transfer begins. The data address is loaded into register 24 and overwrites the MAP data address therein. The word count register 36 is also overwritten.

While register 31 and 33 hold the MAP data address and register 34 holds the word count, the data transfer is executed (See FIG. 13). These registers are not modified (incremented) unless a MAP word is actually transferred. If no data transfer is then being requested the MAP data transfer continues.

The memory is started and the address of the MAP data is supplied to the memory via driver 23 to the address bus of bus system 22. The address of the MAP register at which MAP data is to be loaded is then loaded into the address register 24 via register 32, multiplexer 43 and buffer 44 upon the assertion of the INC signal.

The channel is then ready for the MAP transfer and determines whether the transfer is to be from the memory into the MAP (a MAP load operation) or is to be into memory from the MAP (a MAP dump operation).

If a read (a multiple load) operation is required the current location in memory is read out the memory data are clocked from the memory into the HSC OUT register 11 via bus system 22, buffer 16, and, on the same clock, the location of the data being specified by the MAP address is clocked into address register 24. Then the MAP data present in the HSC OUT register is loaded into the MAP at the MAP address present in the address register 24, and the next memory address is set up to be loaded into the address register 24, the READY signal is again asserted and a data transfer request test is again made to determine if a data transfer is being requested. If a data transfer is requested, the data transfer is made as before (See FIG. 13).

If no data transfer is requested the transfer of MAP data into the MAP register unit is continued as before (with a data request test being made after each successive transfer of MAP data) until the last word of the MAP load operation is indicated by the presence of the LAST ADDR signal at which time the last word of the MAP data is transferred into the MAP unit in the last load operation as shown. The READY signal is asserted and a data request test is again made. If a data transfer is requested, a MAP load is indicated as having been completed (CLR MAP) and the data transfer is begun with the loading of the first address of the data block to be transferred and the data transfer proceeds as in FIG. 13.

If a data transfer is not being requested the MAP load is indicated as completed (CLR MAP), the READY signal is asserted and a new request test is made, the system returning to its START operation (FIG. 13) if a transfer is requested or to its RESET operation if no transfer is requested (FIG. 13).

The write (or MAP dump) operations, both "multiple dump" and "last dump" operations, are essentially similar to the read (or MAP load) operations and provide for appropriate data transfer request tests during both the multiple dump process and the last dump process as shown.

What is claimed is:

1. A data processing system comprising a central processor unit and a memory, said system further including
    channel means separate from said central processor unit for permitting direct access to said memory by input/output devices external to said central processor unit, said channel means including
    memory allocation means capable of translating logical addresses from a selected input/output device into physical addresses for said memory in response to a request therefor from said selected input/output device;
    data transfer means for providing a direct transfer of a block of one or more data words directly between a selected input/output device and said memory upon request from said input/output device and for providing a direct transfer of memory allocation information between said memory allocation means and said memory upon request from said central processor unit;
    address transfer means capable of transferring to said memory physical addresses which have been translated from logical addresses received from said selected input/output device and further capable of transferring to said memory physical addresses which have been received from said selected input/output device; and
    control means being responsive to a request signal from a selected input/output device for a transfer of a block of one or more data words and being further responsive substantially at the time of said request to an input signal from said input/output device identifying the direction of transfer of said block of data words and to another input signal identifying whether said transfer requires a memory address translation by said memory allocation means, said control means supplying control signals to said address transfer means, to said data transfer means, and to said memory allocation means for controlling the operations thereof.

2. A data processing system in accordance with claim 1 wherein said address transfer means includes means, responsive during a transfer of a block of data words to information identifying the number of data word addresses in a block thereof to be transferred, for counting the number of data word addresses as the data words are sequentially transferred between said input/output devices and said memory and for providing a signal indicating when the last data word in a block has been so transferred.

3. A data processing system in accordance with claim 2 wherein said data transfer means includes parity check means responsive to said data words which are being transferred for determining whether a data word error has occurred and for halting the transfer of said data words until said error has been corrected.

4. A data processing system in accordance with claim 3 wherein said address transfer means includes parity check means responsive to physical addresses which are being transferred for determining whether an address error has occurred and for halting the transfer of data words until said address error has been corrected.

5. A data processing system in accordance with claim 1, said data transfer means including common data transfer paths internal to said channel means capable of transferring said data words and said memory allocation information.

6. A data processing system in accordance with claim 5 and further including multiplexer means connected in said common data transfer paths for providing the multiplexed transfer of said data words and said memory allocation information between said channel means and said memory depending on whether a transfer of data words or a transfer of memory allocation information is required.

7. A data processing system in accordance with claim 1 wherein said address transfer means includes address register means which, during the transfer of memory allocation information into said memory allocation means, is responsive to first addresses identifying the locations in said memory of said memory allocation information for supplying said first addresses to said memory and responsive to second addresses identifying the locations in said memory allocation means where the memory allocation information is to be located for supplying said second addresses to said memory allocation means.

8. A data processing system in accordance with claim 7 wherein said address transfer means further includes multiplexer means for providing for the multiplexed transfer of said first and second addresses into said address register means.

9. A data processing system in accordance with claim 2 wherein said address counting means is responsive, during a transfer of memory allocation information, to information identifying the number of memory allocation information addresses to be transferred for counting the number of memory allocation information addresses as said memory allocation information is transferred and for providing a signal indicating when said memory allocation information has been completely transferred to said memory allocation means.

10. A data processing system in accordance with claim 1 wherein the addresses received from a selected input/output device include page address information and word address information and said address transfer means includes a first transfer path for transferring the word address information directly to said memory and a second transfer path for selectively permitting the page address information to be transferred directly to said memory without translation or to be transferred to said memory allocation means for translation of said page address into a physical page address for subsequent transfer to said memory.

11. A data processing system in accordance with claim 1 wherein said control means includes
    means for providing a ready signal to said selected input/output device for indicating when said channel means is ready for a transfer of a block of data words; and
    means for providing a data signal to said selected input/output device after said ready signal has been provided and when said data word transfer is occurring for permitting said block of data words to be transferred.

12. A data processing system in accordance with claim 1, wherein said control means further includes means responsive to a parity enabling signal from said input/output device for enabling the detection of errors in the addresses received from said input/output device and in the data words which are being transferred.

13. A data processing system in accordance with claim 1 wherein said memory allocation means includes a plurality of allocation regions, the number of logical address entries in each said region being substantially equal to the entire logical address base of said system, each input/output device being capable of selecting any one of said allocation regions for use in a logical address translation operation.

14. A channel bus means for use in a data processing system having a central processor unit, a memory, a channel means separate from the central processor unit for providing direct access to the memory by one or more units external to the central processor unit, said one or more external units having interface means, and channel control means for controlling the operation of said channel means, said channel bus means providing a bus interface between said channel control means and the interface means of said one or more external units and including means responsive to a request signal from an external unit interface means requesting a data transfer between an external unit and said memory for supplying said request signal to said channel control means;

means responsive to a direction signal from said external interface means indicating the direction of said data transfer for supplying said direction signal to said channel control means;

means responsive to a ready signal from said channel control means indicating said channel means is ready for said data transfer to occur for supplying said ready signal to said external unit interface means; and means responsive to a data signal from said channel control means indicating that said data transfer is occurring for supplying said data signal to said external unit interface means.

15. A channel bus means in accordance with claim 14 wherein said channel bus means further includes means responsive to a parity enabling signal from said external unit interface means enabling the detection of errors in addresses received from said external unit for supplying said parity enabling signal to said channel control means.

16. A channel bus means in accordance with claim 14 or 15 wherein said channel bus means further includes means responsive to an address translation signal from said external unit interface means indicating whether said data transfer requires a memory address translation for supplying said address translation signal to said channel control means.

17. A channel bus means in accordance with claim 16 wherein said channel bus means further includes means responsive to a word count signal from said external unit interface means indicating the number of data words to be transferred when a block of data words is to be transferred for supplying said word count signal to said channel control means.

* * * * *

UNITED STATES PATENT AND TRADEMARK OFFICE
CERTIFICATE OF CORRECTION

PATENT NO. : 4,403,282
DATED : September 6, 1983
INVENTOR(S) : Kenneth D. Holberger and Joseph E. Samson It is certified that error appears in the above-identified patent and that said Letters Patent are hereby corrected as shown below:

On the Title page, Item [75],
    Delete "Kenneth D. Holberger, Marlboro;"
    After "Framingham," insert --Mass.--
    Delete "both of Mass."

Signed and Sealed this

Fourteenth Day of February 1984

[SEAL]

Attest:

GERALD J. MOSSINGHOFF

Attesting Officer     Commissioner of Patents and Trademarks